(12) United States Patent
Sivaraman et al.

(10) Patent No.: US 8,768,419 B2
(45) Date of Patent: Jul. 1, 2014

(54) MOBILE BATTERY PARTITIONING SYSTEM AND METHOD

(75) Inventors: Sundar X. Sivaraman, Tamil Nadu (IN); Maria M. Sagayaraj, Tamil Nadu (IN); Narayanadhoss X. Gopalakrishnan, Tamil Nadu (IN); Ganesh X. Ramasamy, Tamil Nadu (IN); Ramprasath X. Hariharan, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 13/359,019

(22) Filed: Jan. 26, 2012

(65) Prior Publication Data

US 2013/0196720 A1 Aug. 1, 2013

(51) Int. Cl.
*H04B 1/38* (2006.01)

(52) U.S. Cl.
USPC ........ 455/573; 455/572; 455/574; 455/343.4; 455/343.5; 455/343.1; 320/136

(58) Field of Classification Search
USPC ............ 455/572–574, 343.1–343.6; 713/300, 713/340; 320/136
See application file for complete search history.

(56) References Cited

U.S. PATENT DOCUMENTS

| | | | | |
|---|---|---|---|---|
| 5,539,297 A * | 7/1996 | Fiebig | ............................ | 320/126 |
| 5,920,179 A * | 7/1999 | Pedicini | ........................ | 320/122 |
| 6,198,250 B1 * | 3/2001 | Gartstein et al. | .............. | 320/112 |
| 6,668,179 B2 * | 12/2003 | Jiang | ............................ | 455/572 |
| 6,710,578 B1 * | 3/2004 | Sklovsky | ....................... | 320/127 |
| 7,023,175 B2 * | 4/2006 | Guang et al. | ................... | 320/106 |
| 7,233,127 B2 * | 6/2007 | Chen et al. | ..................... | 320/106 |
| 7,389,439 B2 * | 6/2008 | Yoon et al. | ..................... | 713/323 |
| 7,598,702 B2 * | 10/2009 | Walrath | ........................ | 320/107 |
| 7,629,765 B2 * | 12/2009 | Chen et al. | ..................... | 320/106 |
| 7,653,825 B1 * | 1/2010 | White et al. | .................... | 713/322 |
| 7,725,094 B2 * | 5/2010 | Chary | ......................... | 455/343.5 |
| 7,730,331 B2 * | 6/2010 | Yoon et al. | ..................... | 713/300 |
| 7,825,629 B2 * | 11/2010 | Studyvin et al. | ............... | 320/122 |
| 7,825,631 B2 * | 11/2010 | Chen et al. | ..................... | 320/134 |
| 7,928,691 B2 * | 4/2011 | Studyvin et al. | ............... | 320/116 |
| 7,953,459 B2 * | 5/2011 | Kim et al. | ...................... | 455/574 |
| 8,055,314 B2 * | 11/2011 | Jin et al. | ........................ | 455/574 |
| 8,120,321 B2 * | 2/2012 | Vezzini et al. | ................. | 320/118 |
| 8,193,662 B1 * | 6/2012 | Carlson et al. | .................. | 307/66 |
| 8,258,754 B2 * | 9/2012 | Chen et al. | ..................... | 320/136 |
| 8,285,340 B2 * | 10/2012 | Hackborn et al. | ............. | 455/567 |
| 2002/0001745 A1 * | 1/2002 | Gartstein et al. | ................ | 429/61 |
| 2003/0158609 A1 * | 8/2003 | Chiu | .............................. | 700/22 |
| 2004/0189250 A1 * | 9/2004 | Nishida | ......................... | 320/116 |

(Continued)

*Primary Examiner* — Kashif Siddiqui
*Assistant Examiner* — Mong-Thuy Tran

(57) ABSTRACT

A device is configured to receive a request for two or more battery partitions; create the two or more battery partitions according to the received request, where each of the two or more battery partitions relate to a respective function of the device; calculate usage of the two or more battery partitions; present information regarding the usage of the two or more battery partitions; receive a request to change an allotment of at least one of the two or more battery partitions; and re-partition two or more battery partitions according to the received request to change of the allotment of the at least one of the two or more battery partitions. Additionally, the device can be configured to charge one or more battery partitions in an order of priority, re-assign one or more battery partitions to a different area, and provide notifications of usage.

20 Claims, 10 Drawing Sheets

(56) References Cited

U.S. PATENT DOCUMENTS

| | | | |
|---|---|---|---|
| 2005/0012540 A1* | 1/2005 | Bertram | 327/410 |
| 2005/0070339 A1* | 3/2005 | Kim | 455/572 |
| 2005/0083016 A1* | 4/2005 | Yau et al. | 320/116 |
| 2005/0085277 A1* | 4/2005 | Chen et al. | 455/572 |
| 2005/0097376 A1* | 5/2005 | Weinberger et al. | 713/320 |
| 2005/0143144 A1* | 6/2005 | Shin et al. | 455/574 |
| 2005/0268131 A1* | 12/2005 | Matsunobu | 713/323 |
| 2006/0033475 A1* | 2/2006 | Moore | 320/132 |
| 2006/0075268 A1* | 4/2006 | Kim et al. | 713/300 |
| 2006/0143483 A1* | 6/2006 | Liebenow | 713/300 |
| 2006/0145538 A1* | 7/2006 | Proefrock et al. | 307/18 |
| 2007/0004467 A1* | 1/2007 | Chary | 455/572 |
| 2007/0043962 A1* | 2/2007 | Misawa | 713/300 |
| 2007/0205745 A1* | 9/2007 | Chen et al. | 320/136 |
| 2007/0298753 A1* | 12/2007 | Tary et al. | 455/343.6 |
| 2008/0057894 A1* | 3/2008 | Aleksic et al. | 455/187.1 |
| 2008/0133956 A1* | 6/2008 | Fadell | 713/340 |
| 2008/0191663 A1* | 8/2008 | Fowler et al. | 320/118 |
| 2008/0268828 A1* | 10/2008 | Nagaraja | 455/419 |
| 2009/0027006 A1* | 1/2009 | Vezzini et al. | 320/118 |
| 2009/0164152 A1* | 6/2009 | Creus et al. | 702/63 |
| 2010/0045242 A1* | 2/2010 | Nagashima et al. | 320/157 |
| 2010/0123436 A1* | 5/2010 | Herrod et al. | 320/132 |
| 2010/0134305 A1* | 6/2010 | Lu et al. | 340/636.13 |
| 2010/0213897 A1* | 8/2010 | Tse | 320/116 |
| 2010/0332233 A1* | 12/2010 | Chen et al. | 704/270 |
| 2011/0040990 A1* | 2/2011 | Chan et al. | 713/300 |
| 2011/0040996 A1* | 2/2011 | Hackborn et al. | 713/340 |
| 2011/0128007 A1* | 6/2011 | Nishidai et al. | 324/427 |
| 2011/0221446 A1* | 9/2011 | Yount | 324/434 |
| 2012/0015695 A1* | 1/2012 | Hackborn et al. | 455/566 |
| 2012/0025786 A1* | 2/2012 | Heizer et al. | 320/160 |
| 2012/0083258 A1* | 4/2012 | Rabii | 455/418 |
| 2012/0221878 A1* | 8/2012 | Pocklington et al. | 713/340 |
| 2013/0060393 A1* | 3/2013 | Somasundaram et al. | 700/291 |

* cited by examiner

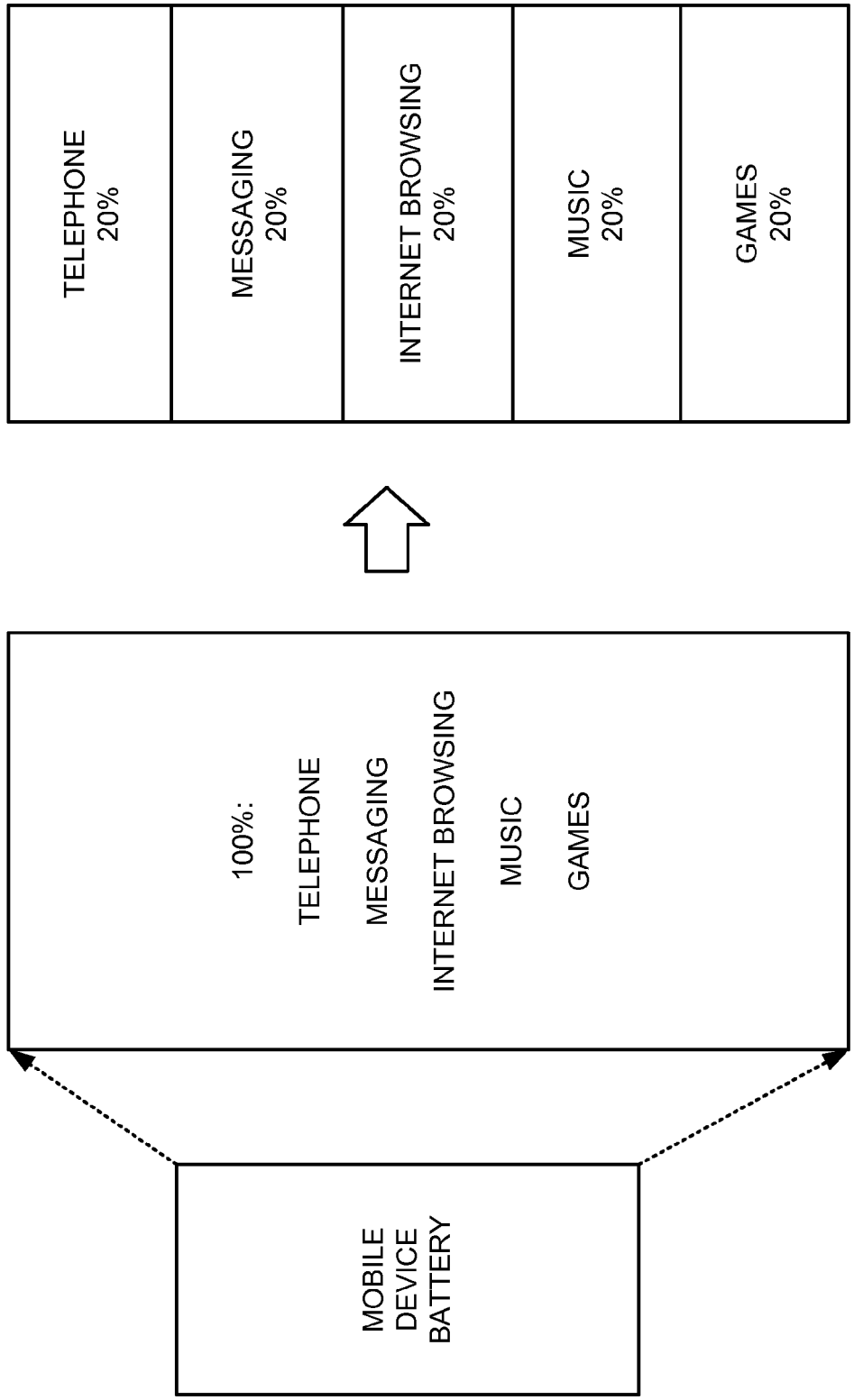

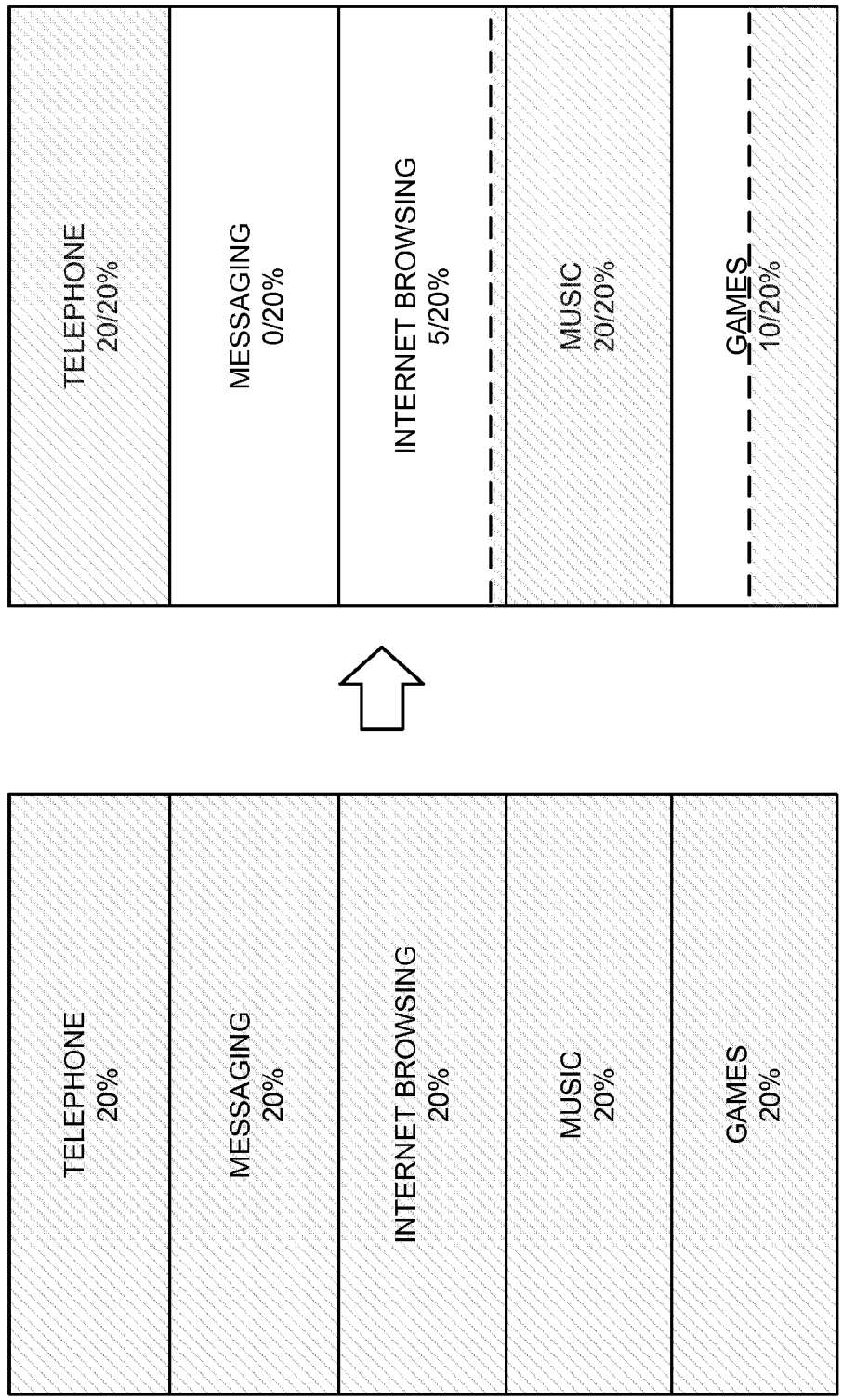

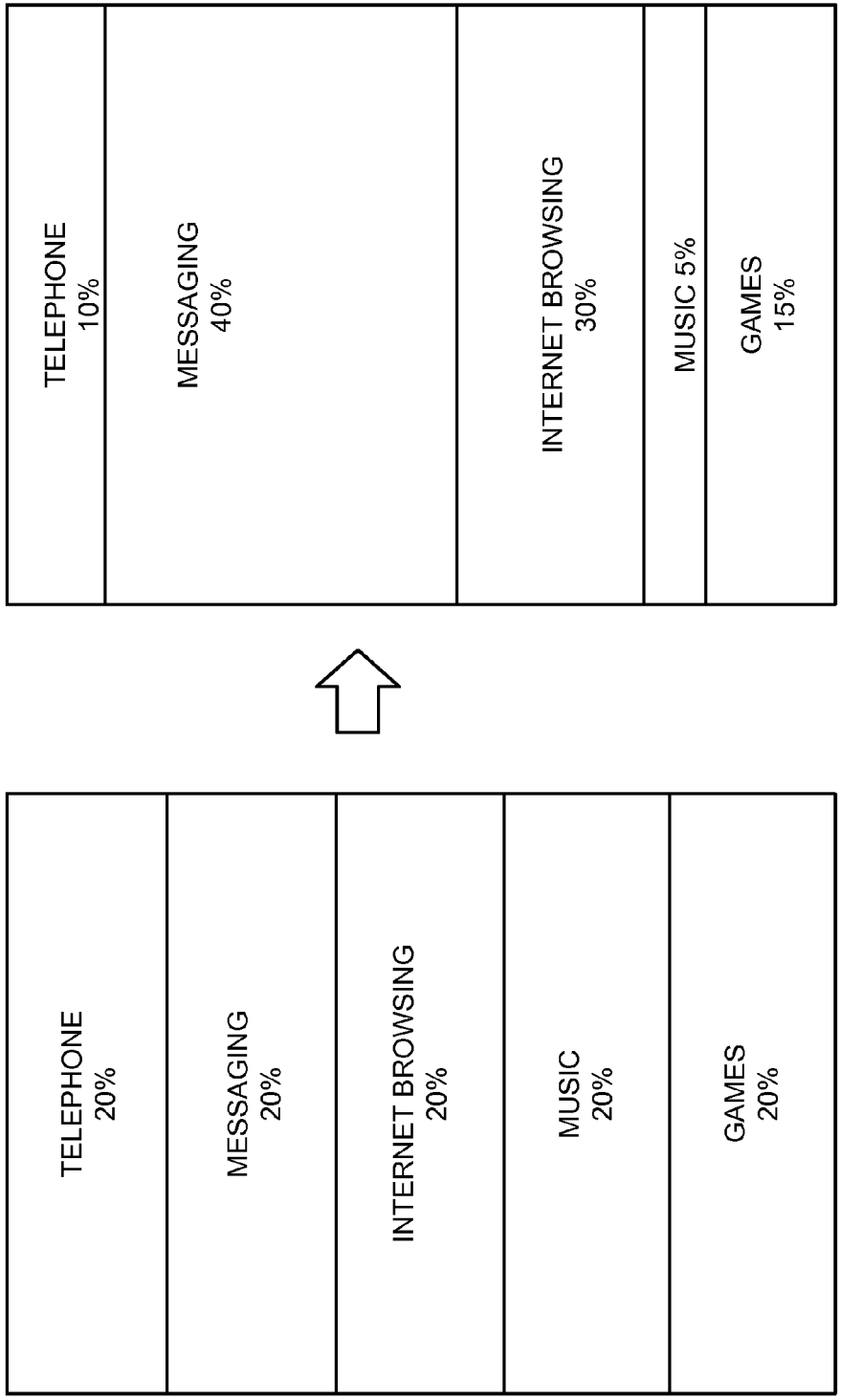

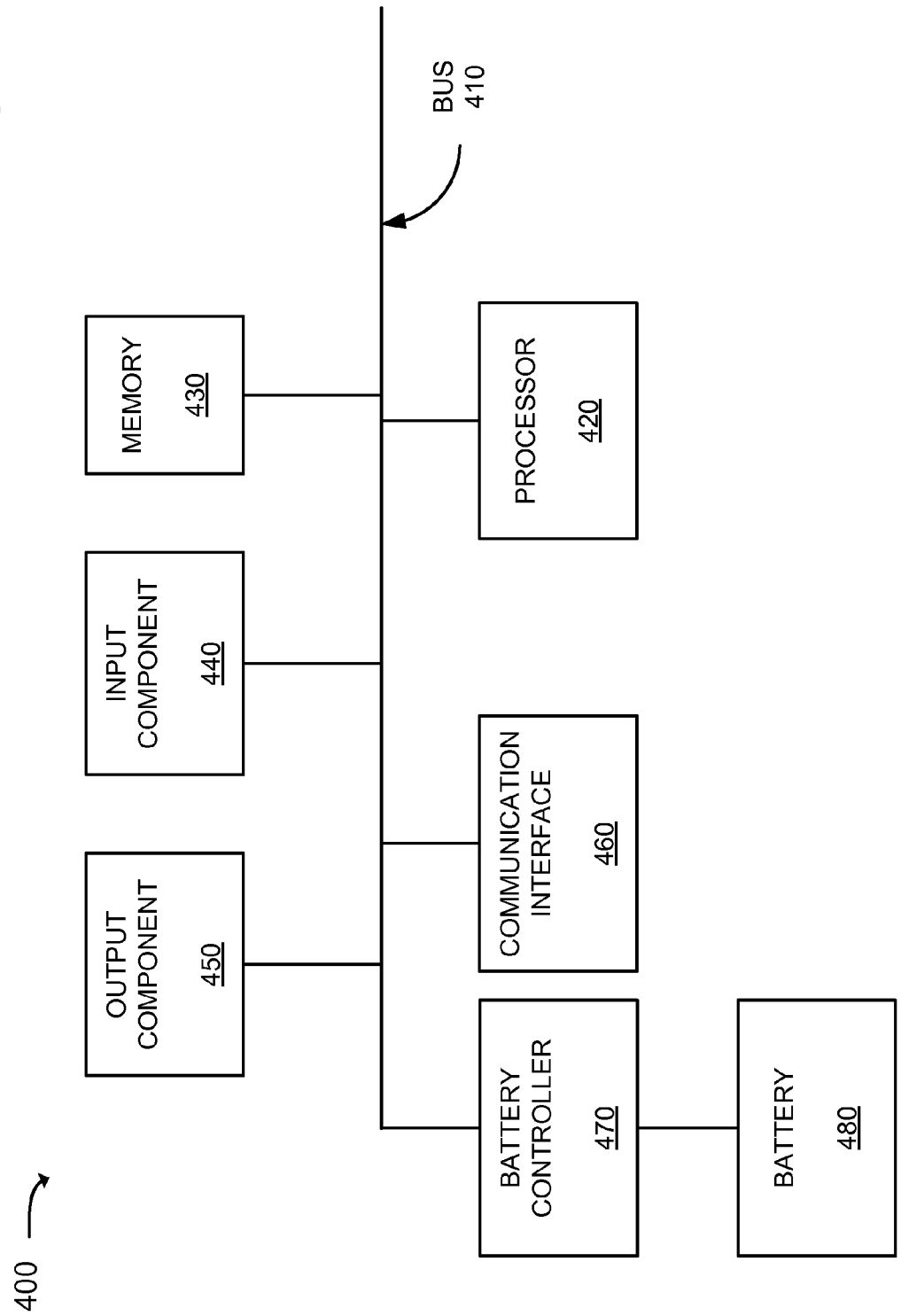

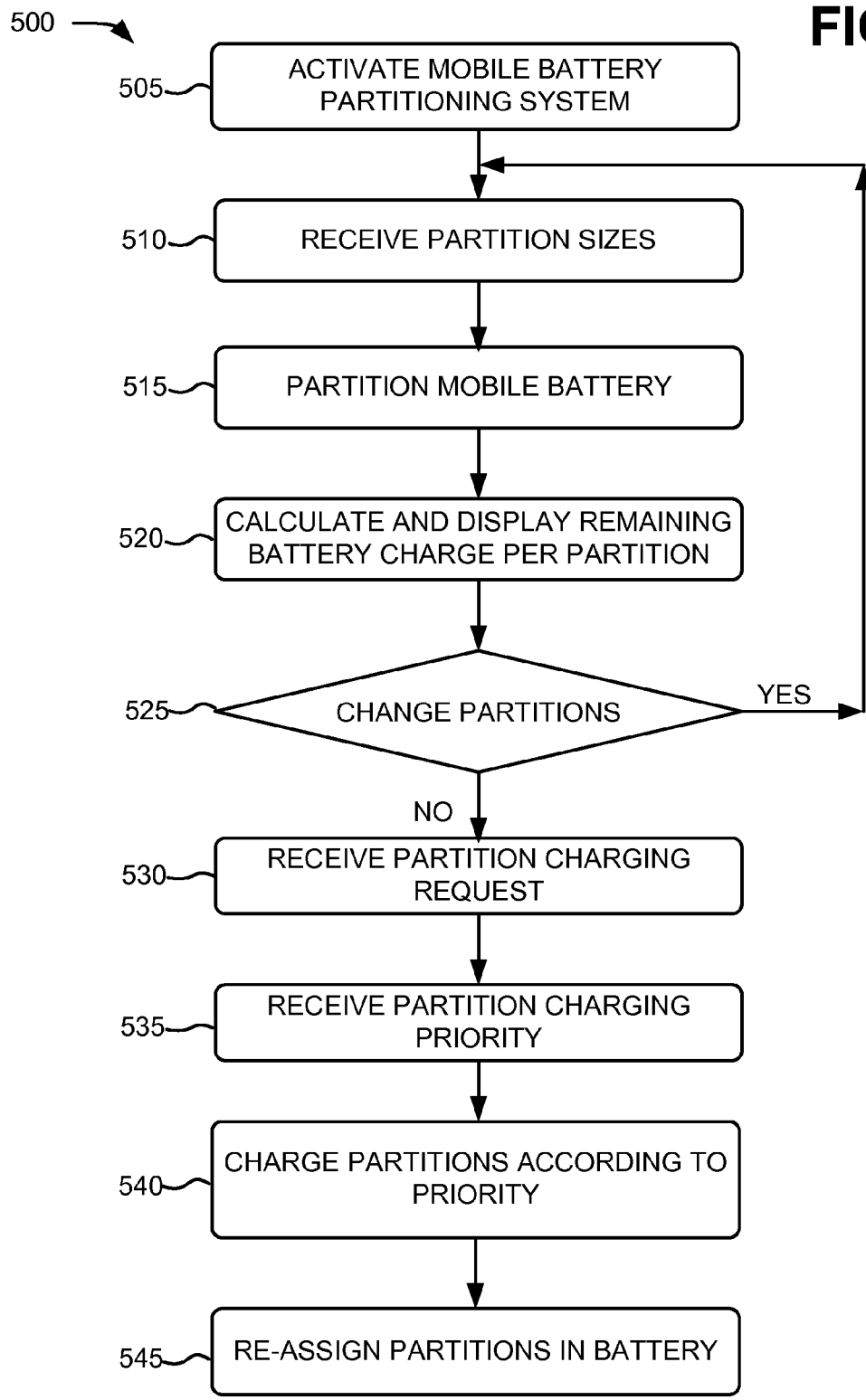

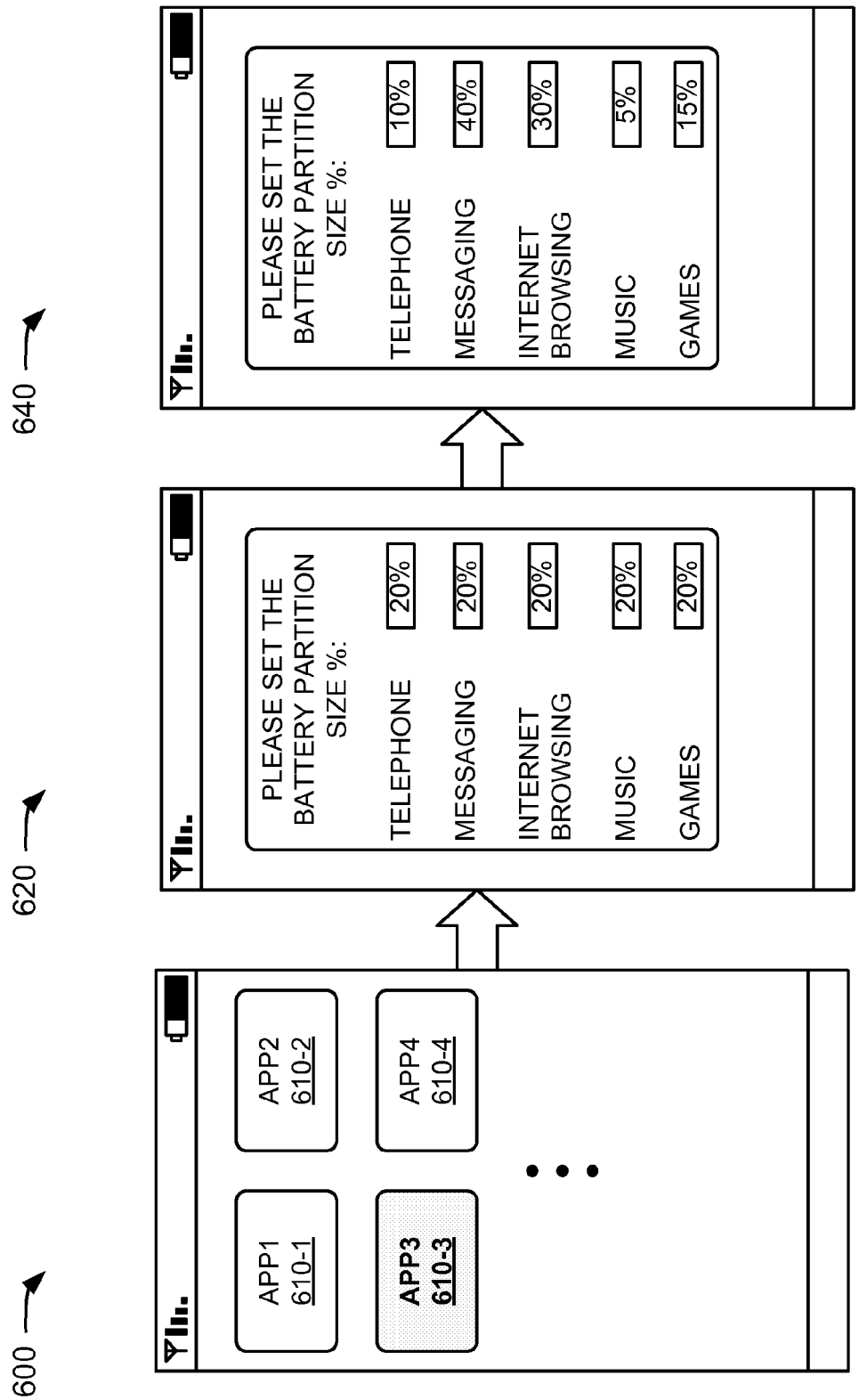

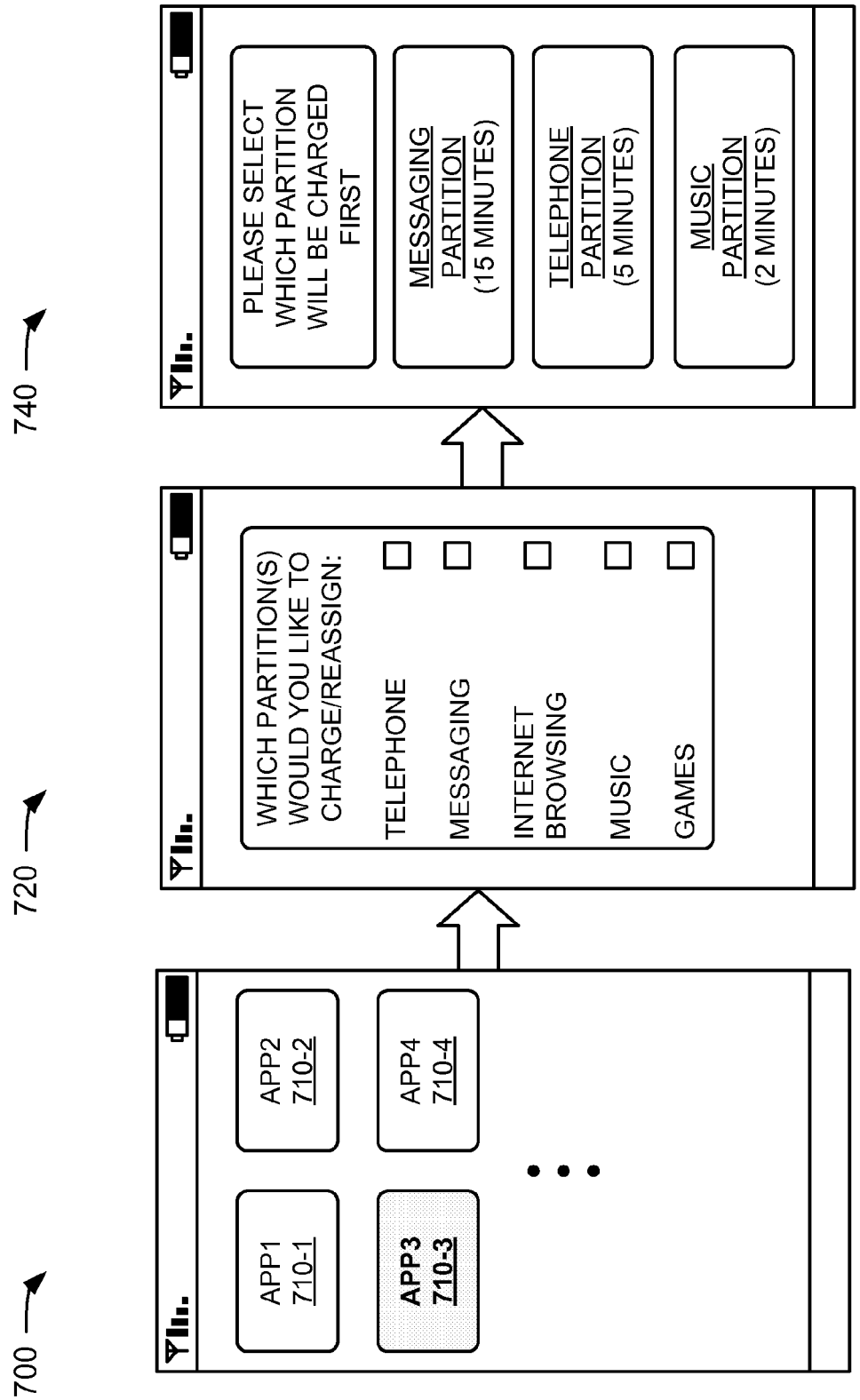

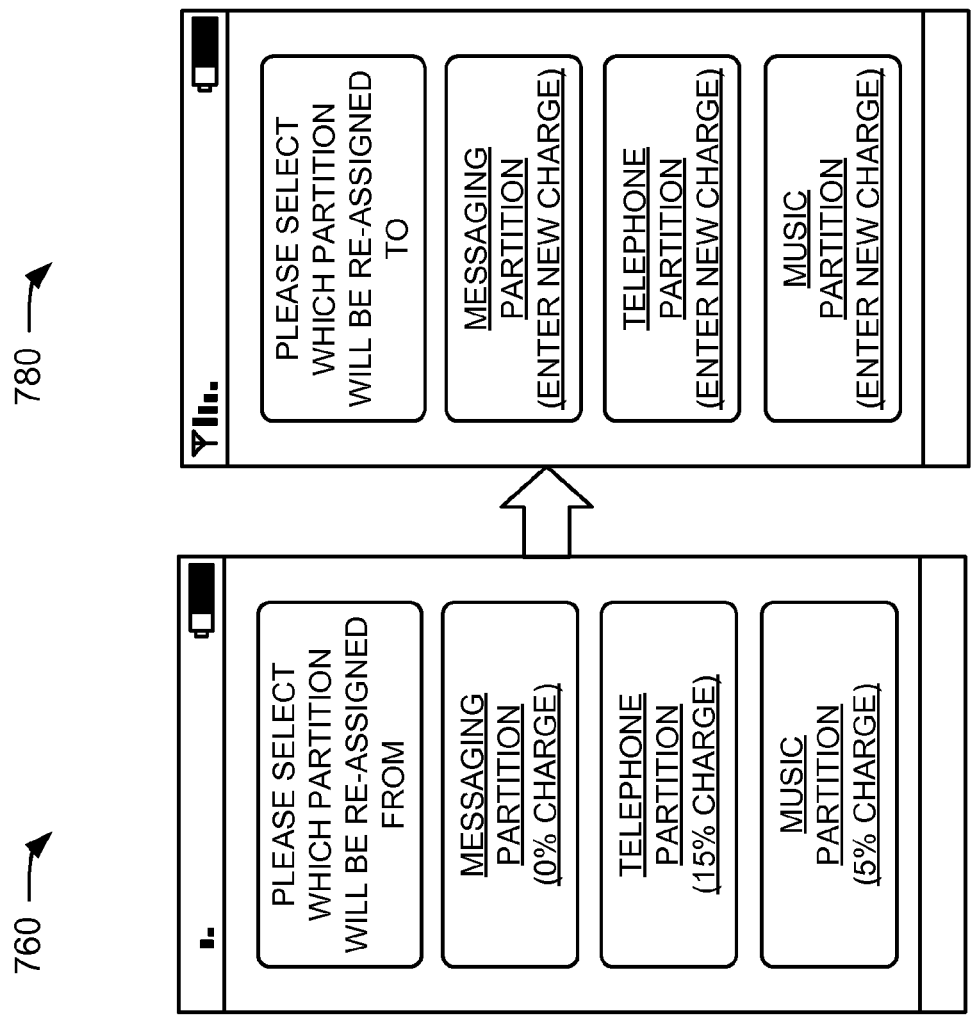

MOBILE BATTERY PARTITIONING SYSTEM AND METHOD

BACKGROUND

Mobile devices, such as smart telephones, require batteries to power various functions, such as telephone calling, messaging, internet browsing, music playing, and games playing. Mobile device batteries are being made lighter and of higher capacity materials, but still do not provide sufficient battery life for many mobile device users.

BRIEF DESCRIPTION OF THE DRAWINGS

FIG. 1 is a diagram of an example battery with which systems and/or methods described herein may be implemented;

FIG. 2 is a diagram of an example battery usage in an example battery according to an implementation described herein;

FIG. 3 is a diagram of an example battery re-partitioning in an example battery according to an implementation described herein;

FIG. 4B is a diagram of example components of a device that uses a battery of FIG. 1;

FIG. 5 is a flow chart of an example process for performing partitioning operations for batteries according to an implementation described herein;

FIGS. 6A-6C are diagrams of example user interfaces according to an implementation described herein;

FIGS. 7A-7E are diagrams of example user interfaces according to an implementation described herein.

DETAILED DESCRIPTION OF PREFERRED EMBODIMENTS

Figure 4A:
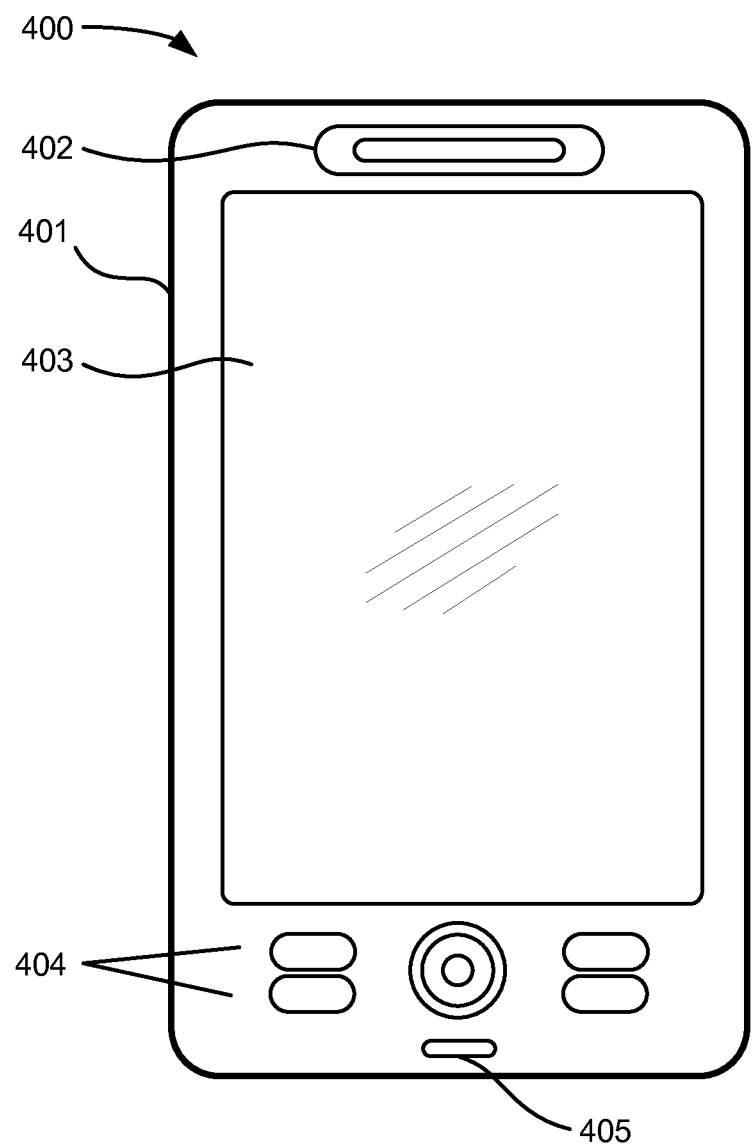
FIG. 4A is a diagram illustrating an example device that uses a battery of FIG. 1.

The following detailed description refers to the accompanying drawings. The same reference numbers in different drawings may identify the same or similar elements.

Systems and/or methods described herein may provide an optimized battery profile for mobile devices by partitioning a mobile device battery. The partitions may make mobile device battery use more efficient and may prolong battery life. Partitions can also be provided to reserve battery life for particular functions, such that less important functions do not utilize all of the battery charge that may be needed for more important functions. For example, a battery of a mobile telephone can be partitioned for media streaming (e.g., a high battery drain process) and telephone calls (e.g., a primary function of a mobile telephone) in different partitions of the battery, so that the mobile telephone can utilize the entire partition dedicated to media streaming without impinging upon the mobile telephone's ability to make telephone calls.

In one example implementation, a battery may be partitioned to allow for power to be provided to particular functions based upon a partitioning profile. The partitioning profile can be changed depending on a pattern of usage, or a user's preferences. The partitions can be re-charged in a particular priority or en masse, such that the user of the mobile device can prioritize the charging process. The partitions can also be re-assigned in the battery.

Batteries, such as lithium-ion batteries, also have a limited number of discharge (or recharge) cycles per battery. For example, some lithium-ion batteries can expect to have between 500 to 5000 discharge cycles before the batteries can no longer hold a sufficient charge. Batteries can have a higher number of discharge cycles based on a lower "depth of discharge." Depth of discharge is an estimation of how much of the battery is used per discharge before the battery is recharged. For example, if a battery is used only 20% before the battery is fully recharged, then the depth of discharge would be 20%. The lower the depth of discharge, the more discharge cycles the battery can have before losing its charge capacity. For example, a 25% depth of discharge could be recharged about 2500 times compared to a 40% depth of discharge, which could be recharged 400 times for an example battery. The reasons that the number of discharges lowers for higher depths of discharge are often attributed to elevated temperatures occurring in recharging higher depths of discharge, and higher currents used in recharging higher depths of discharge.

In order to increase the number of discharge cycles per battery, partitioning a battery to decrease a depth of discharge can be used. Additionally, partitioning a battery can increase recharge speed since only a fraction of the battery would need to be recharged.

Battery partitioning can also be applied to multi-cell batteries. Partitions can be assigned to one or more specific individual cells and charging can be limited to the one or more specific individual cells. Additionally, partitions can be re-assigned to different cells in order to spread the number of discharge cycles between multi-cells. For example, a first partition can be assigned to a first cell, and a second partition can be assigned to a second cell. If the first partition is discharged more frequently than the second partition, then the first partition can be re-assigned to the second cell after a particular number of discharge cycles.

As used herein, the term mobile device is intended to be broadly construed to include any battery compatible device that can utilize battery partitioning, such as mobile telephone that utilize battery partitioning for telephone calls, text messaging, and internet browsing. Mobile device may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a gaming device; a music player; or another type of computation and/or communication device. In one example, mobile device may include a device that is capable of utilizing a battery partitioning system and/or method provided herein.

The term battery, as used herein, is intended to be broadly construed to include any energy storage device that can be provided in a mobile device to provide power. A battery may include rechargeable batteries, such as nickel-based batteries, lithium-based batteries, polymer batteries, or any other type of battery that can be partitioned for discharging and charging.

Some batteries, such as lithium-ion batteries, can include multi-cells and an on-board computer. The on-board computer of a battery can include one or more temperature sensors, one or more circuits to regulate voltage and current, and a battery charge state monitor, which can be used to aid the control of the charging process for the battery. The mobile device can communicate with the on-board computer of the battery, and the mobile device can change the behavior of the mobile device in view of information from the on-board computer of the battery. Additionally, or alternatively, the mobile device can change the behavior of the battery and/or the on-board computer of the battery in view of information from the user of the mobile device, the mobile device itself, or the communications from the on-board computer of the battery. For example, the mobile device and/or the on-board computer of the battery can control the charging process for the battery.

FIG. 1 is a diagram of an example battery with which systems and/or methods described herein may be implemented. In one implementation, a battery can be partitioned into one or more partitions, and each partition can be assigned to a function of the mobile device. As illustrated, a mobile device battery, which utilizes 100% capacity for telephone, messaging, internet browsing, music, and games, can be partitioned to provide particular partition capacities for each. For example, the mobile device battery can be partitioned into 5 partitions of 20% capacity each, and can be evenly assigned to telephone, messaging, internet browsing, music, and games. While FIG. 1 shows an even distribution, the battery partitions can also be unevenly distributed.

Each partition could then be utilized for each function (e.g., telephone, messaging, internet browsing, music, and games) until its allotted battery capacity is depleted. Each partition that has not been depleted would remain until depleted, thus allowing a user of a mobile device to reserve battery life for specific functions, such as telephone calls, that may be needed at a later time. Each partition can correspond to a portion of cell of a single cell or a multi-cell battery, or can correspond to one or more cells of a multi-cell battery.

FIG. 2 is a diagram of an example battery usage in an example battery according to an implementation described herein. As illustrated, the battery can start off as full in each partition, and can be discharged differently in each partition depending on usage. For example, as shown in FIG. 2, the telephone partition can remain fully charged (e.g., 20% remaining), the messaging partition can be fully discharged (e.g., 0% remaining), the internet browsing partition can be partially discharged (e.g., 5% remaining), the music partition can be fully charged (e.g., 20% remaining), and the games partition can be partially discharged (e.g., 10% remaining).

At this point of the discharge cycle, the telephone partition would still have sufficient battery charge to allow for telephone calls to be made, but the messaging partition would not have sufficient battery charge to allow for messaging to occur. Similarly, the internet browsing partition, the music partition, and the games partition would allow for further discharge of their portions of the battery.

FIG. 3 is a diagram of an example battery re-partitioning in an example battery according to an implementation described herein. According to one implementation, a battery can be re-partitioned to increase or decrease the size of each partition. If, for example, the user of the mobile device utilized more messaging than music, then the battery can be partitioned to have more battery assigned to messaging than music. As illustrated, the partition for messaging can increase to 50% while the partition for music can decrease to 5%. Additionally, other re-partitioning can occur, such as telephone decreasing to 10%, internet browsing increasing to 30%, and games decreasing to 15%. The re-partitioning allotments can also be done during initial partitioning, and can be adjusted.

FIG. 4A is a diagram illustrating an example device 400 that may correspond to a mobile device. As shown in FIG. 4A, device 400 may include a housing 401, a speaker 402, a touch-screen display 403, control buttons 404, and/or a microphone 405. Housing 401 may protect the components of device 400 from outside elements. Housing 401 may include a structure configured to hold devices and components used in device 400, and may be formed from a variety of materials. For example, housing 401 may be formed from plastic, metal, or a composite, and may be configured to support speaker 402, touch-screen display 403, control buttons 404, and/or microphone 405.

Speaker 402 may provide audible information to a user of device 400. Speaker 402 may be located in an upper portion of device 400, and may function as an ear piece when a user is engaged in a communication session using device 400. Speaker 402 may also function as an output device for music and/or audio information associated with games and/or video images played on device 400.

Touch-screen display 403 may provide visual information to the user. For example, touch-screen display 403 may display text, images, video, and/or graphics received from another device, and/or information regarding incoming or outgoing calls or text messages, emails, media, games, phone books, address books, the current time, etc. In one example, display 403 may include a liquid crystal display (LCD), such as a thin film transistor (TFT) LCD, etc.

In one implementation, touch-screen display 403 may be configured to receive user input when a user touches (or comes in close proximity to) touch-screen display 403. For example, the user may provide an input to touch-screen display 403 directly, such as via the user's finger, or via other devices, such as a stylus. User inputs received via touch-screen display 403 may be processed by components and/or devices operating in device 400. The touch-screen display 403 may permit the user to interact with device 400 in order to cause device 400 to perform one or more operations. Example technologies to implement a touch screen on touch-screen display 403 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows touch-screen display 403 to be used as an input device. Touch-screen display 403 may also identify movement of a body part or a pointing device as it moves on or near the surface of the touch-screen display 403.

Further, in some implementations, touch-screen display 403 may be configured to distinguish between different touch pressures. For instance, a user may touch and move a finger over touch-screen display 403 to emulate movement of a pointing device and may then press harder on touch-screen display 403 to select an object.

Control buttons 404 may permit the user to interact with device 400 to cause device 400 to perform one or more operations. For example, control buttons 404 may be used to cause device 400 to transmit information. Microphone 405 may receive audible information from the user. For example, microphone 405 may receive audio signals from the user and may output electrical signals corresponding to the received audio signals.

Although FIG. 4A shows example components of device 400, in other implementations, device 400 may contain fewer, different, differently arranged, or additional components than depicted in FIG. 4A. For example, in some implementations, device 400 may include a keypad, such as a standard telephone keypad, a QWERTY-like keypad (e.g., a traditional configuration of typewriter or computer keyboard keys), or another keypad layout. In still other implementations, a component of device 400 may perform one or more tasks described as being performed by another component of user device 400.

FIG. 4B is a diagram of example components of a device, such as device 400 illustrated in FIG. 4A. Device 400 may include a bus 410, a processor 420, a memory 430, an input component 440, an output component 450, a communication interface 460, a battery controller 470, and a battery 480. Although FIG. 4B shows example components of device 400, in other implementations, device 400 may contain fewer components, additional components, different components, or differently arranged components than depicted in FIG. 4B. Additionally, or alternatively, one or more components of device 400 may perform one or more tasks described as being performed by one or more other components of device 400.

Bus 410 may include a path that permits communication among the components of device 400. Processor 420 may include a processor, microprocessor, or processing logic that may interpret and execute instructions. Memory 430 may include any type of dynamic storage device that may store information and instructions, for execution by processor 420, and/or any type of non-volatile storage device that may store information for use by processor 420.

Input component 440 may include a mechanism that permits a user to input information to device 400, such as a keyboard, a keypad, a button, a switch, etc. Output component 450 may include a mechanism that outputs information to the user, such as a display, a speaker, one or more light emitting diodes (LEDs), etc. Communication interface 460 may include any transceiver-like mechanism that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 460 may include mechanisms for communicating with another device or system via a network. In one alternative implementation, communication interface 460 may be a logical component that includes input and output ports, input and output systems, and/or other input and output components that facilitate the transmission of data to other devices.

Battery controller 470 may include an on-board computer or other controller of battery 480 that permits a device 400 or user to monitor and control usage, charging, and discharging of battery 480. Battery 480 can be any energy device that can be provided in a device 400 to provide power. Battery 480 can include rechargeable batteries, such as nickel-based batteries, lithium-based batteries, polymer batteries, or any other type of battery that can be partitioned.

Device 400 may perform certain operations relating to partitioning a battery. Device 400 may perform these operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. For example, memory 430 can include an application that has software instructions to partition a single cell or multi-cell battery into particular sizes. Alternatively, hardwired circuitry may be used in place of or in combination with software instructions to implement processes described herein. For example, hardwired circuitry can be made to partition a battery to reserve portions of the battery for specific uses. Thus, implementations described herein are not limited to any specific combination of hardware circuitry and software.

While FIG. 4B illustrates example components of a device 400, an on-board computer of a battery, such as a lithium-ion battery on-board computer, can include one or more components of FIG. 4B.

FIG. 5 is a flow chart of an example process for performing partitioning operations for batteries according to an implementation described herein. In one implementation, process 500 may be performed by one or more components of a mobile device. Process 500 may include activating a mobile battery partitioning system (block 505). In one implementation, the mobile battery partitioning system can be provided in an application stored in memory 430 of the mobile device. In one implementation, an application can be selected from a user interface to activate the mobile battery partitioning system. For example, a user can activate an application to launch the mobile battery partitioning system.

FIG. 6A illustrates an example user interface 600 that includes several applications (APP1 610-1, APP2 610-2, APP3 610-3, APP4 610-4, etc.). An application (e.g., APP3 610-3) corresponding to the mobile battery partitioning system can be selected from the several applications to activate the mobile battery partitioning system. For example, a user can select APP3 610-3 to activate the mobile battery partitioning system.

Returning to FIG. 5, process 500 may include receiving partitioning sizes (block 510). In one implementation, several functions of mobile device usage can be listed and battery partition sizes can be entered or changed. In another implementation, specific functions can be selected and battery partition sizes for each selected function can be entered or changed. In another implementation, one or more functions can be assigned battery partition sizes and the remaining functions can be assigned to the remainder of the battery capacity that had not yet been assigned. In another implementation, cells of a multi-cell battery can be listed and assigned to one or more functions manually by the user using the mobile device, or automatically by the mobile device.

FIG. 6B illustrates an example user interface 620 that allows a user to enter battery partition sizes for preset functions. As shown, each of the following may be allotted 20%: telephone, messaging, internet browsing, music, and games. The partitions can be set within an application on the mobile device, and can use memory 430, processor 420, as well as other components of the mobile device (or the on-board computer of the battery) to assist in partitioning the battery. While this example illustrates allotments of 20% for each partition, a user could select any partition size for each preset function, as long as the total amount allotted does not exceed 100%.

Returning to FIG. 5, process 500 may include partitioning the mobile battery (block 515). In one implementation, the mobile device and/or the on-board computer of the battery can use one or more of its components to partition the battery. In one implementation, the partitions can be within one or more cells of a single cell or multi-cell battery.

Process 500 may include calculating and displaying the remaining battery charge per partition (block 520). In one implementation, the mobile device and/or the on-board computer of the battery can use one or more of its components to calculate the remaining battery charge per partition. For example, the on-board computer can measure the remaining battery charge of a partition using a battery charge state monitor included in the on-board computer, and can relay the information to the mobile device. The mobile device can also monitor the remaining battery charge of a partition using one or more components of the mobile device, such as a battery controller that can be used to monitor the remaining battery charge of the battery.

The mobile device may display the remaining battery charge by providing information on one or more partitions as an alert, a message, or a notification on a user interface. In one implementation, audio and/or visual alerts can be triggered if one or more partitions are discharged to a particular level. For example, an audio sound and/or a displayed message can be triggered when a partition is discharged to less than a particular amount (e.g., 4%, 5%, 10%, etc.) remaining. In one implementation, alerts, messages, and/or notifications can be configured by a user. For example, a user can set a threshold, at which alerts occur, such as 10% for calls, 4% for internet browsing, 4% for messaging, and no alerts for music or gaming. Additionally, a user can indicate what type (e.g., audio, visual) of alert is provided for each.

Process 500 may include determining whether to change one or more partition sizes (block 525). In one implementation, process 500 may change the partition sizes or re-assign partition locations for one or more partitions (block 525— YES). For example, if one or more partitions is disproportionately used or unused compared to the allotted partition, then the partition size can change for the partitions that are over-utilized and under-utilized by re-allocating battery charge to the partition that could use more battery charge. The mobile device and/or the on-board computer of the battery can determine whether to change the partition size.

In one implementation, the mobile device and/or the on-board computer can change the partition size based upon the usage to adjust more battery capacity to the more used portions and less to less used portions. For example, if a telephone partition is 20% and an internet browsing partition is at 20%, but the user uses the partitions disproportionately, then the mobile device and/or the on-board computer can determine to change the allotted partition sizes. As another example, if the telephone partition is 20% and the internet browsing partition is 20%, but these two partitions are used evenly, then the mobile device and/or the on-board computer can determine not to change the allotted partition sizes.

FIG. 6C illustrates one implementation of changing the partition sizes. In FIG. 6C, the partition size may be changed manually by a user of the mobile device through interaction with the mobile device. As illustrated, each of the battery partition sizes can be re-assigned through user interface 640. For example, as illustrated in FIG. 6C, the telephone, music, and games partition sizes can be decreased, while the messaging and internet browsing partition sizes can be increased.

In another implementation, the partition size may be changed automatically based upon usage. For example, one or more partitions can use more battery than other partitions leading to the one or more partitions being depleted while battery capacity for other partitions remains. The mobile device and/or the on-board computer of the battery can change the partition size based upon the usage to adjust more battery capacity to the more used portions and less to less used portions.

In another implementation, the partition sizes can be automatically calculated and suggested to a user, and the user could decide to use, change, or reject the suggested partition sizes. For example, the mobile device could calculate that the battery partitions would be better utilized with a 25% telephone partition instead of a 20% telephone partition (with other partitions being sized appropriately to allow for the increased telephone partition size), the mobile device could suggest the revised telephone partition size of 25% via a user interface, and the user could accept, revise, or decline the suggestion.

Returning to FIG. 5, process 500 may determine not to change one or more partition sizes or locations (block 525— NO). For example, if the allotments are similar to battery usage, then the partition sizes and partition locations may remain constant.

Process 500 may include receiving partition charging request (block 530). In one implementation, a partitioning charging request can include a menu on the user interface of the mobile device of all partitions or of only partitions that are not fully charged.

FIG. 7A illustrates user interface 700 that includes several applications (APP1 710-1, APP2 710-2, APP3 710-3, APP4 710-4, etc.). An application (e.g., APP3 710-3) corresponding to the mobile battery partitioning system can be selected from the several applications to activate the mobile battery partitioning system. For example, a user can select APP3 710-3 to activate the mobile battery partitioning system.

FIG. 7B illustrates a partition charging request that can be received from a user through manual selection of options displayed on user interface 720 upon selecting the application 710-3, for example. As illustrated in FIG. 7B, the user of the mobile device can select one or more partitions for charging, such as a telephone partition, messaging partition, internet browsing partition, etc. For example, a user can select a telephone partition, a messaging partition, and an internet browsing partition, and not select the remaining partitions. As another example, a user can select only a telephone partition, and not select the remaining partitions. Additionally, or alternatively, user interface 720 can display selectable options of selecting all or deselecting all. In one implementation, access to other user interfaces, such as FIGS. 6A and 6B can also be accessed from user interface 720. For example, a telephone partition can be expanded to include a larger partition size for charging (with the contraction of one or more other partition sizes to account for the expanded partition size).

Returning to FIG. 5, process 500 may include receiving a partition charging priority (block 535). In one implementation, partitioning charging priority can be done manually by the user through a user interface of the mobile device. For example, as illustrated in FIG. 7C illustrates user interface 740 providing options for the user of the mobile device to select which partition should be charged and in what order. The user of the mobile device can select to charge only a single partition, and then can disconnect after the single partition is charged. For example, if a messaging partition is the most desired partition by the user of the mobile device, the user of the mobile device can charge the mobile device for only the messaging partition.

In one implementation, the amount of time for a full recharge for each partition can be calculated and displayed on user interface 740 to assist the user in selecting which partition to be charged. For example, if the user has only 10 minutes for the charging process, but wants both a telephone partition, which takes 4 minutes, and a messaging partition, which takes 4 minutes, the user can prioritize the telephone partition to be fully charged and then the messaging partition to be partially charged.

Alternatively, or additionally, the number of minutes allotted to each partition for charging can be selected. In one implementation, a specific number of minutes for each partition can be specifically assigned as selected by a user through user interface 740. For example, if the user has only 10 minutes for the charging process, but wants a telephone partition, which takes 5 minutes, a messaging partition, which takes 15 minutes, and a music partition, which takes 2 minutes, then the user can select to charge the telephone partition for 2 minutes, the messaging partition for 6 minutes, and the music partition for the remaining 2 minutes.

Alternatively, or additionally, a percentage of charge can be used instead of minutes. In one implementation, a percentage of each charge for each partition can be assigned as selected by a user through user interface 740. For example, if the user has only 10 minutes for the charging process, but wants a telephone partition, a messaging partition, and a music partition to be charged concurrently for specific percentages, then the user can select to allot charges to each partition in percentage, such as the telephone partition for 40%, the messaging partition for 30%, and the music partition for 20%, and the mobile device and/or the on-board computer can control the charging of the partitions accordingly.

Alternatively, or additionally, the remaining charge time can be selected to go to one or more partitions rather than be specifically assigned a particular number of minutes. For example, a user can select to charge the telephone partition for 2 minutes and the messaging partition for 6 minutes, and the music partition for the total remaining time that the charging is occurring.

In another implementation, partition charging priority can be done automatically by the mobile device and/or the on-board computer of the battery. In other implementations, the charging allotments selected by the user, as discussed above, can also be used to allow a user to select a partition charging priority. For example, the partition charging priority can be based on the largest partition, the smallest partition, a preset order, the amount of charging required for a partition, the amount of time required to charge a partition, an order set based upon past usage of partitions, or another order, such as concurrent charging of multiple partitions. Another example can include entering an amount of time for charging, and allowing the mobile device and/or the on-board computer of the battery to allot the amounts of charging done per partition.

Returning to FIG. 5, process 500 may include charging partitions according to their priority (block 540). In one implementation, the mobile device and/or the on-board computer of the battery can control the charging process to send charge to partitions in their order of priority. For example, the mobile device can instruct the on-board computer to charge a first cell of a multi-cell battery before charging a second or third cell of the multi-cell battery. In another implementation, the mobile device and/or the on-board computer of the battery can charge the partitions concurrently. For example, the mobile device can instruct the on-board computer to concurrently charge each cell of a multi-cell battery evenly or disproportionately compared with other cells of the multi-cell battery.

Process 500 may include re-assigning partitions in the battery (block 545). In one implementation, partitions can be re-assigned within a multi-cell battery. For example, partitions can be re-assigned by assigning the one or more battery partitions to one or more cells in a multi-cell battery, reviewing the cells of the battery and determining which cells are assigned to the one or more battery partitions, and re-assigning the one or more partitions to one or more cells that are different from the previous assignment.

In one implementation, partitions can be re-assigned in order to increase battery life. For example, partitions that are heavily used can have heavily used cells that can lead to battery degradation of these heavily used cells before less heavily used cells. In this implementation, heavily used partitions can be moved around to different cells and battery degradation that can be associated with the heavy usage can be distributed throughout several cells of the battery rather than being isolated to the originally assigned cells.

The mobile device and/or the on-board computer of the battery can be used to re-assign partitions within a multi-cell battery. For example, the mobile device can generate a signal requesting a change in partitioning cell assignments and send the signal to the on-board computer of the battery, and the on-board computer of the battery can re-assign the partitions to different cells.

Additionally, or alternatively, battery allotments for one or more partitions can be re-assigned to allow for charged partitions of the battery to be re-assigned to another partition. In one implementation, battery allotments for one or more partitions with remaining battery charge can be re-assigned to another partition when additional battery charge is sought without charging the battery. For example, if a telephone partition is exhausted and a messaging partition remains at least partially charged, then at least part of the battery charge from the messaging partition can be re-assigned to the telephone partition to provide battery charge to the telephone partition.

FIG. 7D, which can be displayed additionally or alternatively to FIG. 7C, illustrates a user interface 760 for selecting at least part of a battery allotment from a source partition (e.g., charged portion of the battery) for re-assigning to a destination partition (e.g., another partition). In one implementation, a user can decide to re-assign at least part of the battery allotment of a fully or partially charged partition (e.g., source partition) to another partition (e.g., a destination partition). The destination partition may be exhausted (e.g., discharged), partially exhausted, or fully charged. For example, as illustrated in FIG. 7D, the messaging partition is exhausted (e.g., 0% charge), so cannot provide a source charge, while the telephone partition and the music partition have remaining charge in the partitions, which can be used as source partitions.

FIG. 7E illustrates a user interface 780 that can allow a selection of a re-assignment destination partition. In one implementation, one or more destination partitions can be selected for re-assignment of battery allotment from one or more source partitions. For example, if a messaging partition is exhausted, then a user can select the messaging partition as the destination partition for re-assignment of battery allotment from one or more source partitions. In one implementation, the re-assignment of battery allotment can be entered for each destination partition. For example, as illustrated in FIG. 7E, a user can enter an amount of new charge for each destination partition, such as the messaging partition, telephone partition, and music partition.

The re-assigning of at least part of a battery allotment can allow for additional battery charge for an exhausted partition without requiring an additional battery charge. For example, if a telephone partition is exhausted, then all or a portion of a battery charge partitioned for messaging can be re-assigned to messaging partition to allow for extended battery usage with or without an additional charge of the battery.

The re-assigning of at least part of a battery allotment can also allow for additional battery charge for a partially exhausted or fully charged partition, such that the battery charge can be increased. For example, if a user is going to be making a series of telephone calls on a particular day, then the user can re-assign the battery allotments for other partitions, such as a music partition and a game partition, to a telephone partition, so that the telephone battery partition charge can be sufficient for the calls.

The re-assigning of at least part of a battery allotment can be temporary and previously assigned partitions and partition sizes can be resumed upon charging of the battery. For example, if a messaging partition is exhausted, and the battery allotment for a music partition is re-assigned to the messaging partition, then the battery allotment can be re-instated to the music partition upon charging of the battery. Alternatively, the battery allotment can be a change in partition until purposefully changed.

Figure 8:
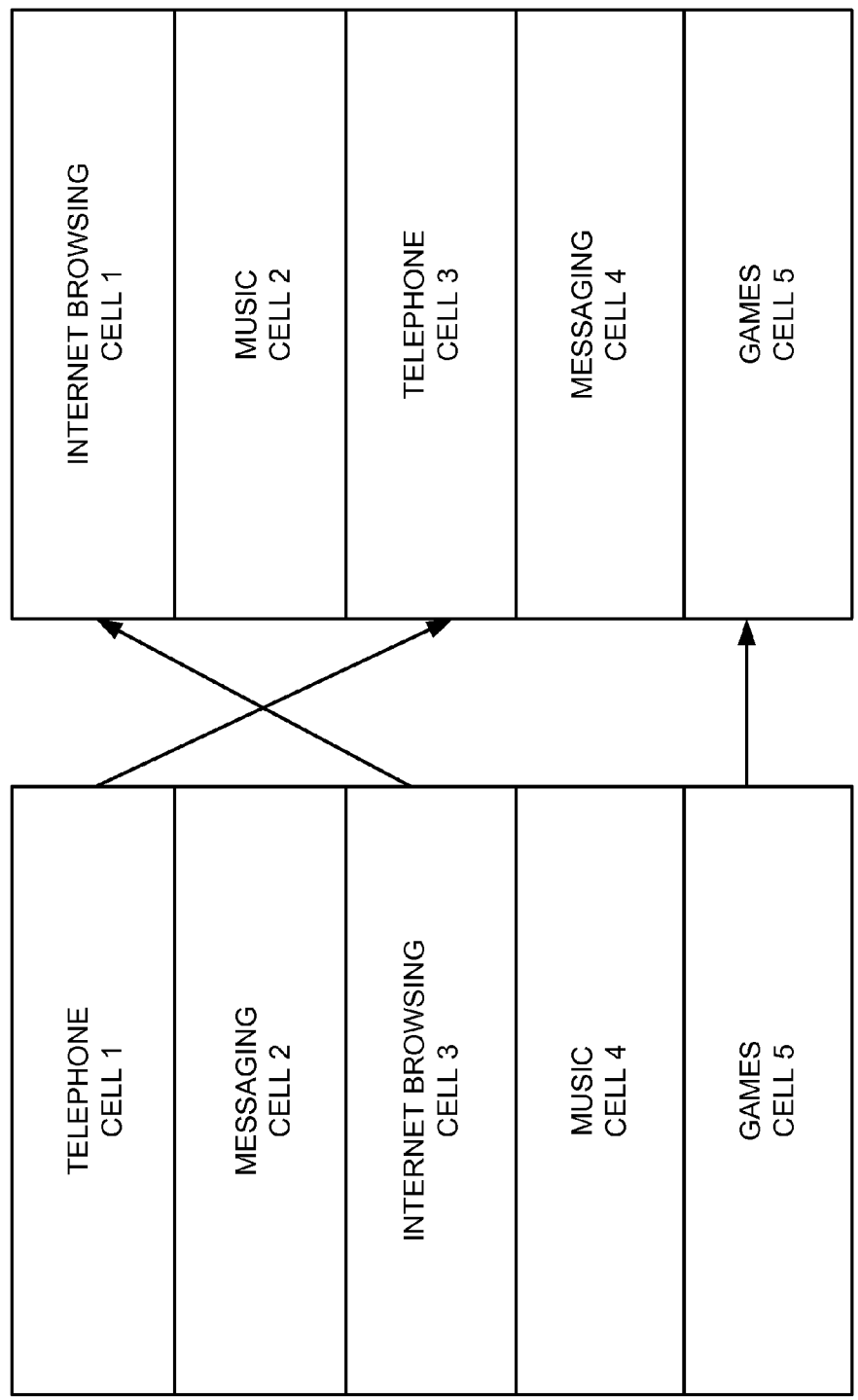
FIG. 8 is a diagram of an example battery partition re-assigning in an example battery according to an implementation described herein.

FIG. 8 is a diagram illustrating an example battery partition re-assigning in an example battery according to an implementation described herein. As illustrated in FIG. 8, a telephone partition can be assigned to cell 1 and an internet browsing partition can be assigned to cell 3. At designated situations, such as particular time or usage intervals, the telephone partition can be moved to cell 3 and the internet browsing partition can be moved to cell 1. Additionally, or alternatively, one or more partitions can remain in their same positions. For example, a games partition can be assigned to cell 4 and can remain in cell 4 even when one or more other partitions are moved. Re-assigning partitions can be used when one partition is more heavily used than another, such that by re-assigning partitions, cells can be utilized on a more even basis. For example, if an internet partition is less heavily utilized and a telephone partition is more heavily utilized, then the mobile device and/or the on-board computer of a battery can track the usages of each partition and determine that the internet partition and the telephone partition should be re-assigned based upon their usage. Additionally, the mobile device and/or the on-board computer can track when re-assignments occur, and schedule for additional re-assignments, if necessary.

Systems and/or methods described herein may provide an optimized battery profile for mobile devices by partitioning a mobile device battery. These partitions may allow a user of the mobile device to reserve battery charge for primary uses, and also may make mobile device battery use more efficient and prolong battery life.

The foregoing description of implementations provides illustration and description, but is not intended to be exhaustive or to limit the implementations to the precise form disclosed. Modifications and variations are possible in light of the above disclosure or may be acquired from practice of the implementations.

For example, while a series of blocks have been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, from a user and by a device, a request for a plurality of battery partitions of a multi-cell battery;
    creating, by the device, the plurality of battery partitions according to the received request for the plurality of battery partitions, wherein each of the plurality of battery partitions relates to a respective function of the device, and wherein each of the plurality of battery partitions corresponds to one or more cells in the multi-cell battery;
    calculating, by the device, usage of the plurality of battery partitions;
    presenting information, by the device and to the user, regarding the usage of the plurality of battery partitions;
    receiving, from the user and by the device, a request to change an allotment of at least one of the plurality of battery partitions; and
    re-partitioning, by the device, two or more of the plurality of battery partitions according to the received request to change the allotment of the at least one of the plurality of battery partitions,
    wherein the re-partitioning causes changes to the one or more cells in the multi-cell battery that correspond to the two or more of the plurality of battery partitions.

2. The method of claim 1, further comprising:
    receiving, from the user, a selection of one or more of the plurality of battery partitions for charging;
    receiving, from the user, an order of priority of battery partition charging, wherein the order of priority identifies a charging order for the one or more of the plurality of battery partitions for charging; and
    charging the one or more of the plurality of battery partitions in the order of priority.

3. The method of claim 1, further comprising:
    receiving, from the user, a selection of one or more of the plurality of battery partitions for charging;
    identifying an order of priority for the one or more of the plurality of battery partitions, where the order of priority identifies a charging order for one or more of the plurality of battery partitions for charging, and where the order of priority is preset or automated; and
    charging the one or more of the plurality of battery partitions in the order of priority.

4. The method of claim 1, further comprising:
    assigning the plurality of battery partitions to particular groups of cells in the multi-cell battery;
    reviewing the plurality of battery partitions assigned to the particular groups of cells in the multi-cell battery; and
    re-assigning one of the plurality of battery partitions to a different group of cells in the multi-cell battery.

5. The method of claim 4,
    where reviewing the plurality of battery partitions assigned to the particular groups of cells in the multi-cell battery includes reviewing cells of the multi-cell battery and determining which of the cells are assigned to the plurality of battery partitions, and
    where re-assigning the one of the plurality of battery partitions includes re-assigning the plurality of battery partitions to a plurality of the cells that are different from a previous assignment.

6. The method of claim 1, where presenting the information regarding the usage of the plurality of battery partitions includes providing a notification of the usage for display on a display device associated with the device.

7. The method of claim 1, where presenting the information regarding the usage of the plurality of battery partitions includes providing an audible notification of the usage.

8. The method of claim 1, where receiving the request to change the allotment includes:
receiving a selection of an allotment of at least one of the plurality of battery partitions;
receiving an automated signal to change the allotment based on a battery partition usage history; or
receiving an automated signal to change the allotment based on a preset battery partition usage threshold being exceeded.

9. The method of claim 1, where re-partitioning of the plurality of battery partitions includes changing the allotment of one or more charged battery partitions, of the plurality of battery partitions, and one or more discharged battery partitions, of the plurality of battery partitions, to provide battery charge to the one or more discharged battery partitions.

10. A mobile device comprising:
a multi-cell battery; and
a processor to:
receive, from a user of the mobile device, a request to partition the multi-cell battery into a plurality of battery partitions with battery partition assignments within the multi-cell battery, wherein each of the plurality of battery partitions relate to a respective function of the mobile device;
create the plurality of battery partitions according to the received request, wherein each of the plurality of battery partitions corresponds to one or more cells in the multi-cell battery;
receive, from the user, a selection of one or more of the plurality of battery partitions for charging;
receive, from the user, an order of priority of battery partition charging, where the order of priority identifies a charging order for the one or more of the plurality of battery partitions for charging; and
charge the one or more of the plurality of battery partitions in the order of priority.

11. The mobile device of claim 10, where, when receiving the order of priority, the processor is to:
automatically determine the order of priority of the partition charging.

12. The mobile device of claim 10, where the processor is further to:
assign the plurality of battery partitions to particular groups of cells in the multi-cell battery;
review the plurality of battery partitions assigned to the particular groups of cells in the multi-cell battery; and
re-assign one or more of the plurality of battery partitions to a different group of cells in the multi-cell battery.

13. The mobile device of claim 10, where the processor is to:
assign the plurality of battery partitions to particular groups of cells in the multi-cell battery;
review the plurality of battery partitions assigned to the particular groups of cells in the multi-cell battery;
identify a first battery partition, of the plurality of battery partitions, that is charged and a second battery partition, of the plurality of battery partitions, that is discharged, and
re-assign at least a portion of the first battery partition to the second battery partition.

14. The mobile device of claim 10, where the processor is further to:
calculate usage of at least two of the plurality of battery partitions;
present information regarding the usage of the at least two of the plurality of battery partitions;
receive a request to change an allotment of the at least two of the plurality of battery partitions; and
re-partition the at least two of the plurality of battery partitions to change the allotment of the at least two of the plurality of battery partitions.

15. The mobile device of claim 10, where the processor is further to:
calculate a time for charging at least one of the plurality of battery partitions;
present information regarding the calculated time for charging the at least one of the plurality of battery partitions;
receive a request to charge the at least one of the plurality of battery partitions for a particular amount of time; and
charge the at least one of the plurality of battery partitions for the particular amount of time without charging at least one other one of the plurality of battery partitions.

16. A system, comprising:
a mobile device; and
a multi-cell battery associated with the mobile device,
wherein the mobile device includes at least one processor configured to:
receive, from a user of the mobile device, a request to partition the multi-cell battery into a plurality of battery partitions with battery partition assignments within the multi-cell battery, where each of the plurality of battery partitions relate to a respective function of the mobile device;
create the plurality of battery partitions according to the received request;
assign the plurality of battery partitions to particular groups of cells in the multi-cell battery;
review the plurality of battery partitions assigned to the particular groups of cells in the multi-cell battery;
re-assign at least two of the plurality of battery partitions to different groups of cells in the multi-cell battery;
receive, from the user, a selection of at least two of the plurality of battery partitions for charging;
receive, from the user, an order of priority of partition charging, where the order of priority identifies a charging order for the at least two of the plurality of battery partitions for charging; and
charge the at least two of the plurality of battery partitions in the charging order.

17. The system of claim 16, where, when receiving the charging order, the at least one processor is configured to:
automatically determine the order of priority of partition charging.

18. The system of claim 16, wherein the at least one processor configured to re-assign at least two of the plurality of battery partitions to different groups of cells in the multi-cell battery is further configured to:
re-assign one or more of the plurality of battery partitions from a first cell, of the plurality of cells, to a second cell, of the plurality of cells, in the multi-cell battery.

19. The system of claim 16, where the at least one processor is configured to:
calculate usage of at least two of the plurality of battery partitions;
present information regarding the usage of the at least two of the plurality of battery partitions;

receive a request to change an allotment of the at least two of the plurality of battery partitions; and re-partition the at least two of the plurality of battery partitions according to the received request to change the allotment of the at least two of the plurality of battery partitions.

20. The system of claim 16, where the at least one processor is configured to:

calculate a time for charging at least one of the plurality of battery partitions;

present information regarding the calculated time for charging the at least one of the plurality of battery partitions;

receive a request to charge the at least one of the plurality of battery partitions for a particular amount of time; and charge the at least one of the plurality of battery partitions for the particular amount of time without charging at least one other one of the plurality of battery partitions.

* * * * *